July 30, 1929.  H. A. MUGLER  1,722,818
MULTIPLE AUTOMOBILE PIT
Filed May 11, 1923   2 Sheets-Sheet 1
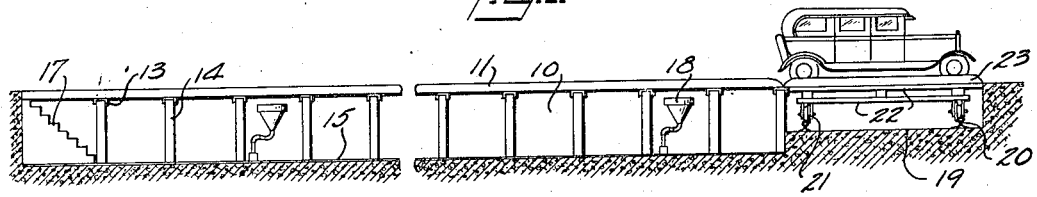
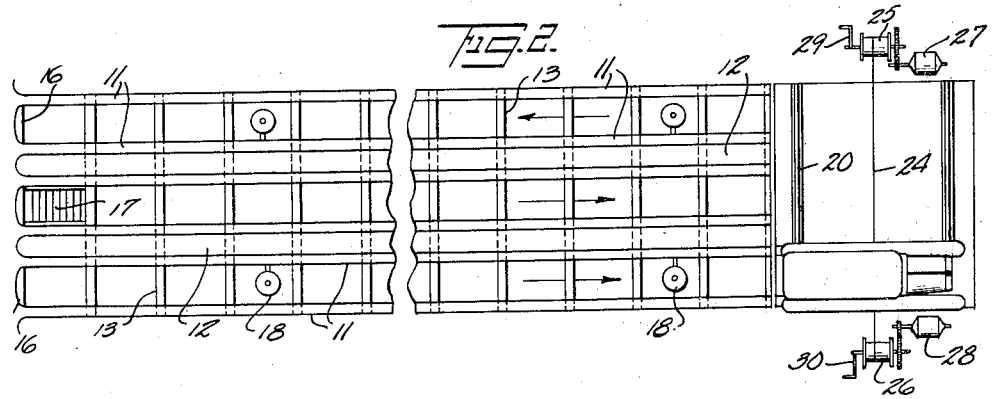
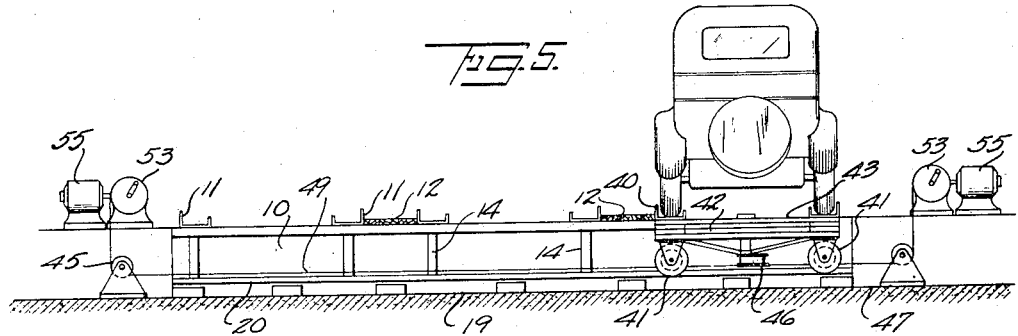
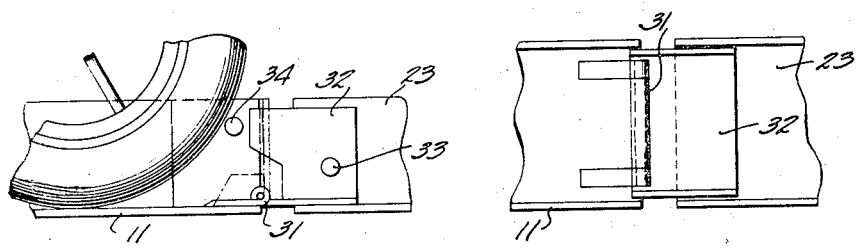
INVENTOR
Herman A. Mugler
BY
W. Wallace White
ATTORNEY

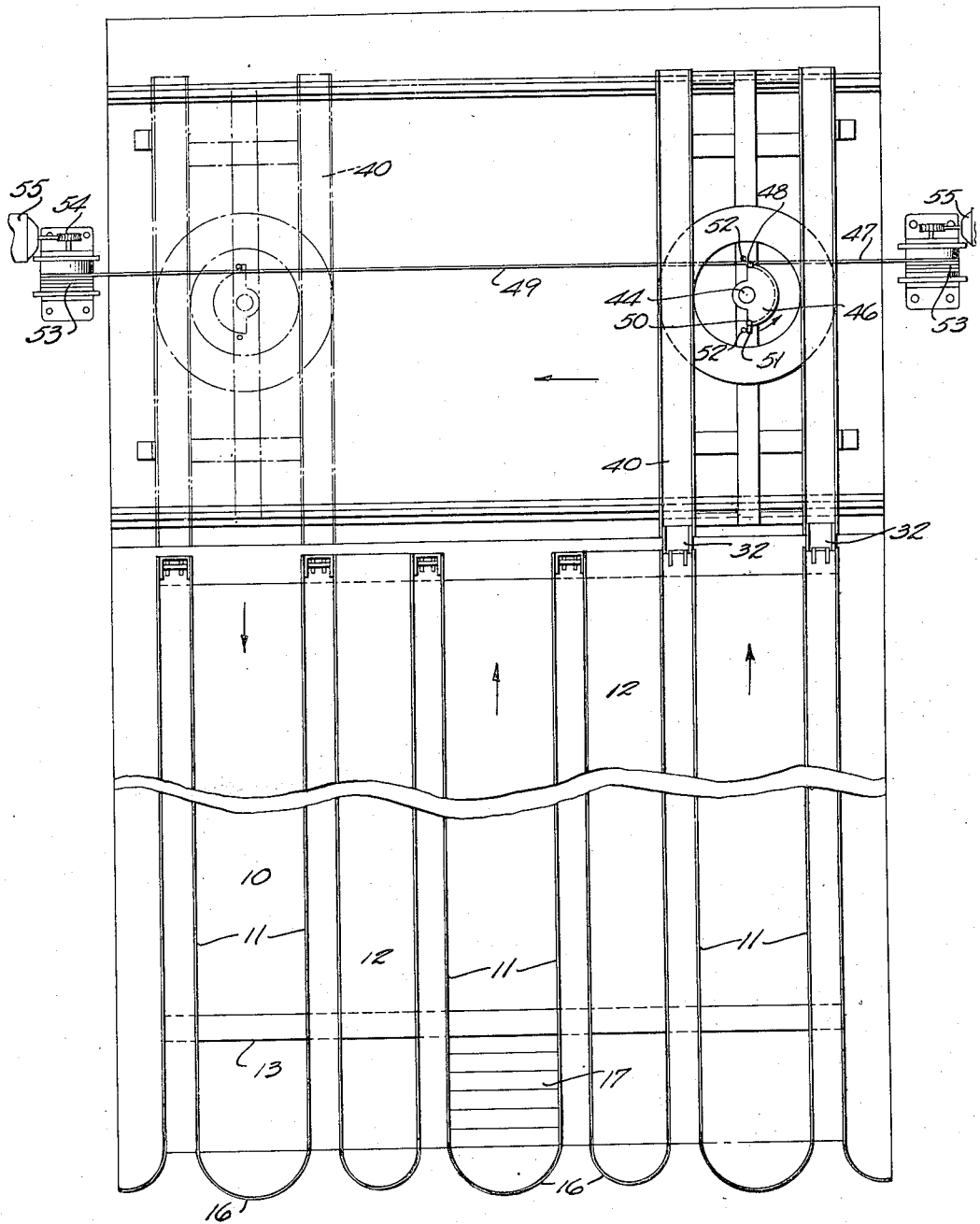

Patented July 30, 1929.

1,722,818

UNITED STATES PATENT OFFICE.

HERMAN A. MUGLER, OF LYNBROOK, NEW YORK.

MULTIPLE AUTOMOBILE PIT.

Application filed May 11, 1928. Serial No. 277,011.

This invention relates to a multiple automobile pit of the type having a plurality of trackways arranged at or near the ground level and overlying a plurality of servicing positions or stations in the pit.

One object of my invention is to provide a multiple car pit adapted to accommodate a maximum number of vehicles when the ground available is comparatively narrow but is of considerable length.

A further object of this invention is to provide a multiple automobile pit having a plurality of trackways each adapted to accommodate a plurality of vehicles and each overlying a plurality of servicing stations or positions.

Still further objects of my invention are to provide means whereby the automobiles may be transferred from one trackway to another and to provide means whereby the automobiles may be advanced forwardly along one of the trackways and may be reversed and shifted so as to move forwardly along another of the tracks.

With these and other objects in view, my invention consists in the novel construction and arrangement of parts hereinafter described, illustrated in the accompanying drawings, and particularly pointed out in the appended claims, it being understood that various changes in the form, proportion, size and minor details may be made without departing from the spirit of the invention or sacrificing any of the advantages thereof.

In the drawings: Fig. 1 is a longitudinal section of the automobile pit; Fig. 2 is a plan view of the same; Figs. 3 and 4 are detail views showing in side and plan views respectively, means for aligning the trackways; Fig. 5 is a vertical cross section showing means for moving the automobiles transversely and for reversing same and Fig. 6 is a plan view of the modified form of the transfer mechanism and of the multiple car pit.

Referring to Figs. 1 and 2 of the drawings the multiple car pit has a common chamber 10 with three parallel trackways 11 which may be of considerable length and are each adapted to accommodate a number of automobiles at the same time. Interposed between adjacent trackways 11 are walkways 12 and at intervals in their length the trackways 11 and walkways 12 are supported by means of transverse beams 13 which are in turn supported by pillars 14 extending between the beams 13 and the floor 15 of the said chamber 10. At the front end of the trackways 11 curved bumpers 16 are provided for the purpose of directing the automobile wheels towards the trackway and one or more stairways 17 are provided to give easy access to the floor of the chamber 10. Each of the trackways 11 overlies a plurality of servicing stations or positions, each of which includes means such as a funnel 18 for the reception of lubricant from the automobile, and other suitable or well known conveniences for use in lubricating, inspecting and repairing automobiles.

At the rear end of the trackways 11, a floor 19 supports a pair of transverse rails 20 for the reception of four flanged wheels 21 on a carriage 22 having a trackway 23 capable of being aligned with any one of the three trackways 11. The carriage 22 may be moved transversely of the trackways 11 by means of a cable 24 wound upon drums 25, 26 driven by suitable gearing from a motor 27 or 28 or by hand through the medium of the crank handles 29 or 30, in such manner that the trackway 23 on the carriage 22 may be aligned with any one of the three trackways 11 so that an automobile may be moved from the carriage 22 to or from any one of the three trackways 11. Thus an automobile may be advanced along one of the trackways 11 until it reaches the rear end thereof and may then be moved onto the carriage 22 which latter may be moved transversely until the automobile is in line with one of the other trackways 11 and the automobile may then be backed off along the latter trackway.

Referring to Figs. 3 and 4 of the drawings, the rear end of each of the trackways 11 has hinged thereto at 31 a channel shaped member 32 adapted to be folded onto the trackway 23 as shown in full line in Figs. 3 and 4 so as to retain the trackways 11 and 23 in alignment and when folded upwardly upon its hinge 31 the member 32 may be locked by means of a bolt or rod passed through holes 33 in the member 32 and through holes 34 in the flanges of the trackways 11 and this bolt or rod serves as a stop to prevent the wheels of an automobile passing off the rear end of any of the trackways 11 when the trackway 23 is out of proper alignment therewith.

The multiple automobile pit shown at Figs. 5 and 6 is similar to that shown in Figs. 1 and 2 but modified means for shifting the automobiles at the rear end of the trackways 11 are shown at Figs. 5 and 6. In this modified form of transfer mechanism, a short movable trackway 40 for the reception of the automobile is mounted upon a carriage comprising two pair of flanged wheels 41 mounted on a lower frame 42 which supports an upper frame 43 in such manner that the upper frame 43 with the trackway 40 thereon may be turned about a vertical axis at 44 in such manner that the automobile on the trackway 40 may be swung around so as to face in the opposite direction. Mounted on a spindle depending from the upper frame 43 is a quadrant member 46 having a cable 47 secured thereto at the point 48 and a second cable 49 secured thereto at the point 50. A projecting pin 51 on the quadrant 46 is adapted to engage one or other of two stop pins 52 on the under frame 42 so that the quadrant 46 with the upper frame 43 and trackway 40 thereon is free to turn through 180 degrees. The cable 49 is passed around a guide pulley 45 and is wound upon a drum 53 having a spindle operated by means of worm gear 54 from an electric motor 55.

In Fig. 6 of the drawing, the carriage and trackway 40 are shown in full lines in alignment with the trackway 11 at the right hand side of the pit and this trackway 11 and trackway 40 are retained in their proper alignment by means of the members 32 and when it is desired to transfer the automobile to another of the trackways 11 and to reverse the automobile so that it may be driven forwardly along the trackway with which it has been aligned, the electric motor 55 at the left hand side of the pit is operated so as to exert a pull on the cable 49 and thereby move the carriage carrying the trackway 40 towards the left hand side and at the same time to cause the upper frame 43 of the carriage and the trackway 40 thereon to turn through 180 degrees and when the carriage reaches the position indicated at dotted line in Fig. 6, the automobile is in position to be driven forwardly along the trackway 11 at the left hand side of the pit.

The cable 47 is adapted to be operated by a drum, gear and motor 53, 54, 55 similar to those provided for the cable 49 and the return movement of the carriage is similar to that above described, the upper frame 43 being reversed whilst the carriage is moved from side to side.

The central trackway 11 may be used only for vehicles which are driven forwardly onto position and are backed off after being lubricated or repaired, or on the other hand, the carriage carrying the trackway 40 may be so operated that an automobile may be caused to pass from the trackway 40 to the central trackway 11 and this could be readily accomplished by the provision of suitable stop or lock mechanisms whereby the carriage could be temporarily retained in the proper position to permit of the swinging movement being effected.

Although the drawings and above specification disclose the best mode in which I have contemplated embodying my invention, it will be understood that in the further practical application of my invention, many changes in form and construction may be made, as circumstances require or experience suggests, without departing from the spirit of the invention within the scope of the appended claims.

What I claim is:—

1. A multiple automobile pit comprising a plurality of spaced trackways each overlying a plurality of servicing positions and a laterally movable carriage located at the end of the trackways for transferring a vehicle from one trackway to another.

2. A multiple automobile pit comprising a plurality of trackways each overlying a plurality of servicing positions and a movable trackway for receiving an automobile and moving the same into alignment with any one of the trackways.

3. A multiple automobile pit comprising a plurality of spaced trackways each overlying a plurality of servicing positions and an end carriage movable laterally of the said trackways for transferring the vehicles from one trackway to another.

4. A multiple automobile pit comprising a plurality of fixed trackways overlying servicing positions in the pit, transverse rails at the end of the trackway, a carriage mounted on said rails and adapted to receive vehicles from one of the fixed trackways, and means for moving the carriage so as to transfer the vehicle to another trackway, and to reverse the position of the vehicle.

5. A multiple automobile pit comprising a plurality of fixed trackways, a movable trackway located at the end of the fixed trackways and adapted to transfer a vehicle from one of the fixed trackways to another and means hinged to the fixed trackways for engaging the movable trackway to insure proper alignment.

6. A multiple automobile pit comprising a plurality of fixed and parallel trackways overlying servicing positions in the pit, end rails extending at right angles to the fixed trackways, a carriage mounted on said rails, a movable trackway mounted on the carriage and adapted to receive an automobile from one of the said fixed trackways and power driven means for moving the carriage on said rails so as to bring the movable trackway into proper alignment with any one of the said fixed trackways.

7. A multiple automobile pit comprising a plurality of fixed and parallel trackways overlying servicing positions in the pit and means for transferring an automobile from one trackway to another including a lower frame, an upper frame pivoted on the said lower frame, means on the upper frame for receiving the automobiles and power driven means for moving the said frames laterally and for swinging the upper frame upon the lower frame to transfer an automobile from one trackway to another and to reverse the position of the automobile.

8. A multiple automobile pit comprising a plurality of spaced trackways overlying servicing positions in the pit, a movable trackway capable of aligning with any of the said fixed trackways, an upper frame supporting said movable trackway, a lower frame supporting said upper frame, transverse rails, flanged wheels supporting said frames upon said rails, and power means for traversing said frames upon said rails to transfer a vehicle from one trackway to another and for swinging the upper frame upon the lower frame to reverse the position of the automobile.

9. A multiple automobile pit comprising a plurality of spaced trackways overlying servicing positions in the pit, a movable trackway capable of aligning with any of the said fixed trackways, supporting means for the movable trackway comprising transverse rails, flanged wheels mounted on the rails a frame mounted on the wheels and a second frame pivotally mounted thereon, and means comprising a cable for pulling the supporting means from one location to another and for swinging the pivoted frame and the movable trackway to reverse the position of an automobile on said trackway.

In testimony whereof I have signed my name to this specification.

HERMAN A. MUGLER.